(12) United States Patent
Thayer et al.

(10) Patent No.: US 8,145,707 B2
(45) Date of Patent: Mar. 27, 2012

(54) SENDING DIGITALLY SIGNED EMAILS VIA A WEB-BASED EMAIL SYSTEM

(75) Inventors: Wayne Thayer, Phoenix, AZ (US); Brad Owen, Mesa, AZ (US)

(73) Assignee: Go Daddy Operating Company, LLC, Scottsdale, AZ (US)

( * ) Notice: Subject to any disclaimer, the term of this patent is extended or adjusted under 35 U.S.C. 154(b) by 1000 days.

(21) Appl. No.: 11/184,259

(22) Filed: Jul. 19, 2005

(65) Prior Publication Data
US 2007/0022291 A1 Jan. 25, 2007

(51) Int. Cl.
*G06F 15/16* (2006.01)
*G06F 21/00* (2006.01)
*H04L 29/06* (2006.01)
*H04L 9/32* (2006.01)
*H04L 9/00* (2006.01)
*H04L 9/08* (2006.01)

(52) U.S. Cl. ........ 709/204; 709/206; 713/155; 713/156; 713/168; 713/169; 713/170; 713/182; 726/26; 726/27; 726/28; 726/30; 380/277; 380/281

(58) Field of Classification Search .................. 709/206, 709/204; 380/277, 281; 713/155, 156, 168–170, 713/182; 726/26–28, 30
See application file for complete search history.

(56) References Cited

U.S. PATENT DOCUMENTS

| | | | |
|---|---|---|---|
| 6,785,810 B1* | 8/2004 | Lirov et al. .................... 713/165 |
| 7,305,545 B2 | 12/2007 | Filipi-Martin et al. | |
| 2002/0031230 A1 | 3/2002 | Sweet | |
| 2002/0059144 A1 | 5/2002 | Meffert et al. | |
| 2003/0037261 A1 | 2/2003 | Meffert et al. | |
| 2003/0154371 A1* | 8/2003 | Filipi-Martin et al. ........ 713/153 |
| 2004/0019780 A1* | 1/2004 | Waugh et al. .................. 713/152 |
| 2004/0133520 A1* | 7/2004 | Callas et al. .................... 705/51 |
| 2005/0114652 A1 | 5/2005 | Swedor et al. | |
| 2006/0041761 A1* | 2/2006 | Neumann et al. ............. 713/189 |
| 2006/0047951 A1 | 3/2006 | Reilly et al. | |
| 2006/0200523 A1* | 9/2006 | Tokuda et al. ................ 709/206 |
| 2007/0022162 A1 | 1/2007 | Thayer et al. | |
| 2007/0022291 A1 | 1/2007 | Thayer et al. | |

OTHER PUBLICATIONS

Tumbleweed, MailGate Secure Messenger, Web page on the Internet, unknown date.
Yahoo!, Yahoo! Anti-Spam Resource Center, Web page on the Internet, unknown date.
Communigatepro, WebUser Interface: Secure Mail (S/MIME), unknown date.
Aug. 13, 2008 Non-Final Rejection, U.S. Appl. No. 11/184,247 (Publication US 2007-0022162 A1).

(Continued)

*Primary Examiner* — Phuoc Nguyen
*Assistant Examiner* — Clarence John
(74) *Attorney, Agent, or Firm* — Stewart J. Womack; Chris A. Watt (57) ABSTRACT

The present invention provides systems and methods for allowing an Email User to create a Public Key Infrastructure (PKI) Email Account and thereafter to digitally sign, send, verify and receive PKI encrypted emails over a computer network, such as the Internet. The systems and methods preferably include a Web-based Email System and a Certificate Authority that coordinate their actions to make the process of creating, maintaining and using the PKI Account as easy as possible for the Email User. In a preferred embodiment, a Keystore System may also be used to enhance the management and use of digital keypairs.

15 Claims, 9 Drawing Sheets

OTHER PUBLICATIONS

Dec. 29, 2008 Response to Aug. 13, 2008 Non-Final Rejection, U.S. Appl. No. 11/184,247 (Publication US 2007-0022162 A1).
Apr. 3, 2009 Non-Final Rejection, U.S. Appl. No. 11/184,247 (Publication US 2007-0022162 A1).
Sep. 30, 2009 Response to Apr. 3, 2009 Non-Final Rejection, U.S. Appl. No. 11/184,247 (Publication US 2007-0022162 A1).
Jan. 25, 2010 Final Rejection, U.S. Appl. No. 11/184,247 (Publication US 2007-0022162 A1).
Jul. 14, 2010 Response to Jan. 25, 2010 Final Rejection, U.S. Appl. No. 11/184,247 (Publication US 2007-0022162 A1).
Apr. 16, 2009 Non-Final Rejection, U.S. Appl. No. 11/184,519 (Publication US 2007-0022292 A1).
Oct. 15, 2009 Response to Apr. 16, 2009 Non-Final Rejection, U.S. Appl. No. 11/184,519 (Publication US 2007-0022292 A1).
Feb. 4, 2010 Final Rejection, U.S. Appl. No. 11/184,519 (Publication US 2007-0022292 A1).
Jul. 21, 2010 Response to Feb. 4, 2010 Final Rejection, U.S. Appl. No. 11/184,519 (Publication US 2007-0022292 A1).
Jul. 22, 2010 Unpublished U.S. Appl. No. 12/841,723.
Sep. 7, 2010 Non-Final Rejection, U.S. Appl. No. 11/184,247 (Publication US 2007-0022162 A1).
Nov. 16, 2010 Response to Sep. 7, 2010 Non-Final Rejection, U.S. Appl. No. 11/184,247 (Publication US 2007-0022162 A1).
Sep. 14, 2010 Final Rejection, U.S. Appl. No. 11/184,259 (Publication US 2007-0022291 A1).
Nov. 16, 2010 Response to Sep. 14, 2010 Final Rejection, U.S. Appl. No. 11/184,259 (Publication US 2007-0022291 A1).
Nov. 9, 2010 Non-Final Rejection, U.S. Appl. No. 11/184,519 (Publication US 2007-0022292 A1).
Nov. 16, 2010 Response to Nov. 9, 2010 Non-Final Rejection, U.S. Appl. No. 11/184,519 (Publication US 2007-0022292 A1).
Feb. 9, 2011 Notice of Allowance of U.S. Appl. No. 11/184,247 (Publication US 2007-0022162 A1).
Jan. 5, 2011 Non-Final Rejection, U.S. Appl. No. 11/184,259 (Publication US 2007-0022291 A1).
Apr. 1, 2011 Response to Jan. 5, 2011 Non-Final Rejection, U.S. Appl. No. 11/184,259 (Publication US 2007-0022291 A1).
Feb. 3, 2011 Non-Final Rejection, U.S. Appl. No. 11/184,519 (Publication US 2007-0022292 A1).
Apr. 1, 2011 Response to Feb. 3, 2011 Non-Final Rejection, U.S. Appl. No. 11/184,519 (Publication US 2007-0022292 A1).
Sep. 2, 2011 Non-Final Rejection, U.S. Appl. No. 12/841,723 (Publication US 2010-0293371 A1).
Sep. 9, 2011 Response to Sep. 2, 2011 Non-Final Rejection, U.S. Appl. No. 12/841,723 (Publication US 2010-0293371 A1).
Jun. 6, 2011 Final Rejection, U.S. Appl. No. 11/184,259 (Publication US 2007-0022291 A1).
Aug. 31, 2011 Response (Appeal) to Jun. 6, 2011 Final Rejection, U.S. Appl. No. 11/184,259 (Publication US 2007-0022291 A1).

* cited by examiner

SENDING DIGITALLY SIGNED EMAILS VIA A WEB-BASED EMAIL SYSTEM

CROSS REFERENCE TO RELATED PATENT APPLICATIONS

This patent application is related to the following patent applications concurrently filed herewith, all assigned to The Go Daddy Group, Inc:

U.S. patent application Ser. No. 11/184,247, "GENERATING PKI EMAIL ACCOUNTS ON A WEB-BASED EMAIL SYSTEM"; and U.S. patent application Ser. No. 11/184,519, "RECEIVING ENCRYPTED VIA A WEB-BASED EMAIL SYSTEM".

FIELD OF THE INVENTION

The present invention relates to improving the security of transmitting and receiving emails via a Web-based Email System, and more particularly to systems and methods for digitally signing, encrypting and decrypting emails.

BACKGROUND OF THE INVENTION

The Internet is a worldwide computer network arranged to allow the easy and robust exchange of information between computer users. Hundreds of millions of people around the world have access to computers connected to the Internet via Internet Service Providers (ISPs). Content providers place multimedia information, i.e. text, graphics, sounds, and other forms of data, at specific locations on the Internet referred to as websites. The combination of all the websites and their corresponding webpages on the Internet is generally known as the World Wide Web (WWW) or simply web.

Email Users routinely send electronic messages (also known as electronic mail or email) to each other over the Internet. Email may contain, for example, text, images, links, and attachments. Email is one of the most widely used methods of communication over the Internet due to the variety of data that may be transmitted, large number of available recipients, speed, low cost and convenience.

Emails may be sent, for example, between friends, family members, coworkers, customers and businesses thereby substituting for traditional letters and office correspondences in many situations. Emails travel across the Internet, typically passing from server to server, at amazing speeds achievable only by electronic data. The Internet provides the ability to send an email anywhere in the world, often in less than a few seconds. Delivery times are continually being reduced as the Internet's ability to transfer electronic data improves.

Most Email Users find email to be much more convenient than traditional mail. Traditional mail requires stamps and envelopes to be purchased and a supply maintained, while emails do not require the costs and burden of maintaining a supply of associated products. Emails may also be sent with the click of a few buttons, while letters typically need to be transported to a physical location, such as a mailbox, before being sent.

Email Users may send and read their email messages using either desktop computer programs, such as MICROSOFT OUTLOOK and IBM LOTUS NOTES (desktop or client-based systems), or via Websites connected to mail servers (Web-based Email Systems).

Web-based Email Systems include a Website connected to Mail Server. Email Users may log onto the Website to read and send emails. A log in process is typically used to authenticate the Email User, by asking for a user ID and password. The advantage of Web-based Email Systems is that the email messages may be more easily sent and accessed from any computer connected to the Internet. This advantage is becoming more pronounced as Email Users want to access their files from an increasing number of locations, e.g. work, home, various travel destinations, etc.

The increase in email use has resulted in an increase in the amount of confidential information transmitted over the Internet. This practice has created a need to improve the security of the transmission process for emails. Protocols, such as S/MIME, PGP, OpenPGP, PEM, and MOSS, have been created and used to protect the privacy of emails and to authenticate the identity of the sender of an email. However, the implementation of these conventional protocols typically requires Email Users to perform multiple steps to create a PKI Email Account with an email system. These conventional steps often result in the Email User having to contact a Certificate Authority and an Email System, and receiving and transmitting their PKI digital keys over the Internet, thereby unnecessarily complicating the process and possibly exposing and compromising the security of their digital keys.

New systems and processes are therefore needed to improve on the security of transmitting and receiving emails. Specifically, new systems and processes are required to simplify the process of creating a PKI Email Account with a Web-based Email System as well the processes for digitally signing, encrypting, and decrypting emails.

SUMMARY OF THE INVENTION

A first embodiment includes a Certificate Authority and a Web-based Email System having one or more PKI Email Accounts, created with the assistance of the Certificate Authority, for one or more Email Users. The Web-based Email System and the Certificate Authority may coordinate their actions in creating the PKI Email Accounts so that the Email Users only have to request a PKI Email Account from the Web-based Email System. This coordination between the Certificate Authority and Web-based Email System greatly simplifies the process for creating PKI Email Accounts for Email Users and improves the security of the PKI digital keys.

Additionally, a Keystore System may be added to the first embodiment to enhance the access and management of digital keys used during the PKI signing, encryption, and decryption of emails. In a preferred embodiment, the Keystore System may be used to store and perform various PKI signing, encryption, and decryption functions. In addition, the Keystore System may be made accessible over a Computer Network to the Web-based Email System and to other Email Systems.

Other embodiments include new and improved methods for generating PKI Email Accounts for a Web-based Email System.

Other embodiments include new and improved methods for digitally signing and transmitting PKI encrypted emails.

Other embodiments include new and improved methods for PKI decrypting received emails.

In yet other embodiments, a plug-in may be installed on a desktop email client, such as Microsoft Outlook®, that permits the desktop email client to access cryptographic functions provided by either a Web-based Email System or by a Keystore System. The Email User would then be able to securely transmit and receive PKI emails from their Web-based Email System and their desktop email client.

Additional advantages and aspects of the present invention will become apparent in the following detailed description of the invention and the claims.

DETAILED DESCRIPTION OF THE PREFERRED EMBODIMENTS

The present invention will now be discussed in detail with regard to the attached drawing figures that were briefly described above. In the following description, numerous specific details are set forth illustrating Applicants' best mode for practicing the invention and for enabling one of ordinary skill in the art to make and use the invention. It will be obvious, however, to one skilled in the art that the present invention may be practiced without many of these specific details. In other instances, well-known machines and process steps have not been described in particular detail in order to avoid unnecessarily obscuring the present invention. Unless otherwise indicated, like parts and processes are referred to with like reference numerals.

Figure 1:
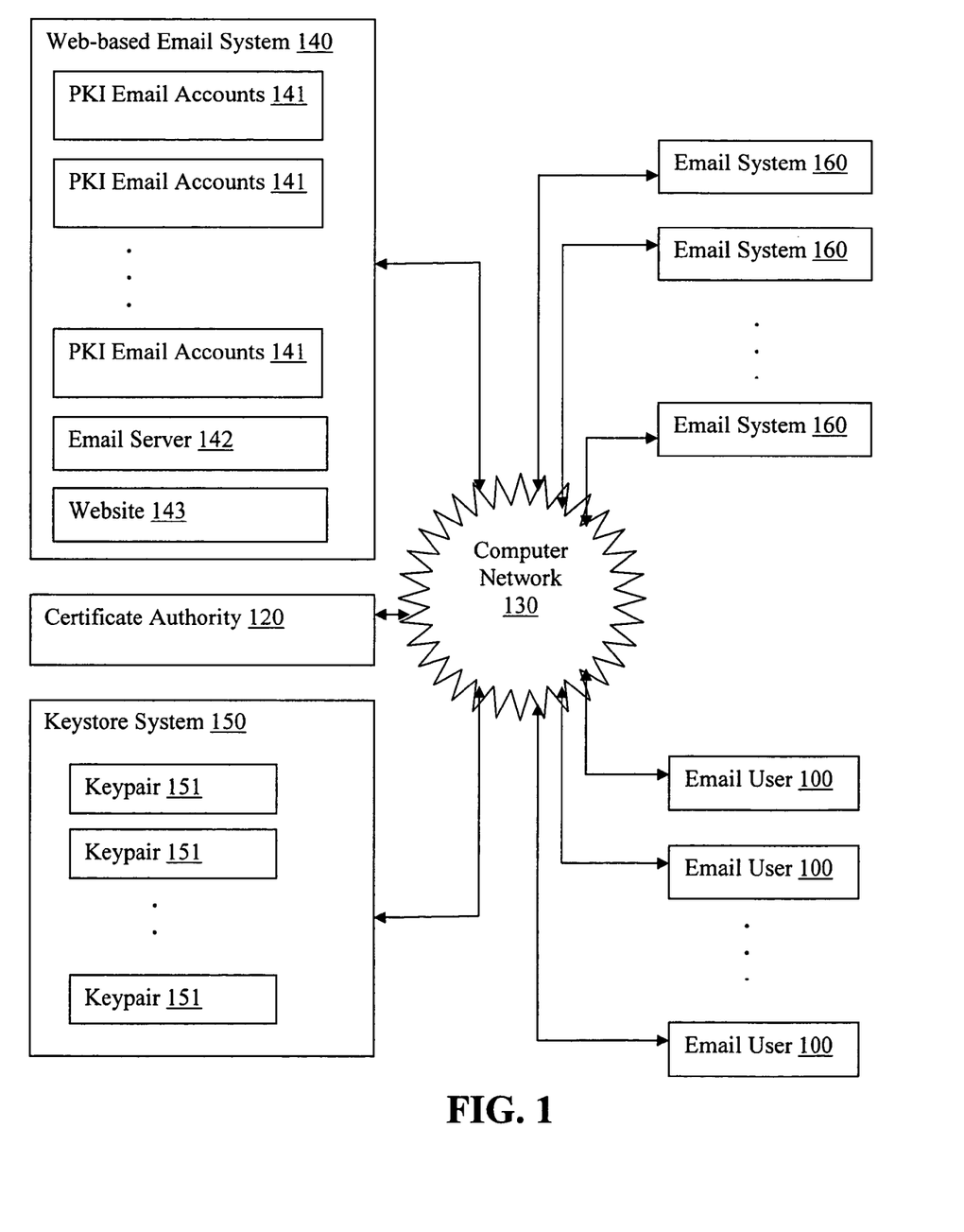
FIG. 1 is a block diagram illustrating an example embodiment of the invention.

The present invention is designed to enhance the security of transmitting and receiving emails over a computer network, such as the Internet. An example embodiment of the invention is illustrated in FIG. 1. A Web-based Email System 140 may be accessed, via a Computer Network 130, by a plurality of Email Users 100. This arrangement permits Email Users 100 to access the Web-based Email System 140 from any computer that has access to the Computer Network 130 thereby allowing Email Users 100 to access the Web-based Email System 140 from practically anywhere in the world. As a further advantage, the Web-based Email System 140 saves Email Users 100 the problem of having to worry about PKI key management, since the Web-based Email System 140 may be configured to store and recall PKI keys without relying on the Email User's client computer.

The Web-based Email System 140 may include at least one Website 143 that permits the exchange of information with Email Users 100 and an Email Server 142 for receiving and transmitting emails over the Computer Network 130. The Web-based Email System 140 may include a first Website for collecting information and creating PKI Email Accounts 141 for Email Users 100 and a second Website for allowing the Email Users 100 to read and send email messages. The first and second Websites may be the same Website or may be different Websites. The PKI Email Accounts 141 may use known encryption techniques such as, for example, Secure/Multipurpose Internet Mail Extensions (S/MIME).

The Web-based Email System 140 is preferably able to perform a variety of functions to assist Email Users 100 in securely sending and receiving PKI signed and/or encrypted emails. Specifically, the Web-based Email System 140 may be able to create PKI Email Accounts 141 for Email Users 100, and assist Email Users 100 in creating emails, PKI signing and/or encrypting emails that are then transmitted to Recipients, and verifying and/or decrypting emails sent to Email Users 100 that have a PKI Email Account 141 with the Web-based Email System 140.

A Certificate Authority 120 is a widely known, trusted, and accredited authority on the Computer Network 130 that issues digital certificates used in the PKI protocols. Using a Certificate Authority 120 allows others on the Computer Network 130 to trust public keys signed by the Certificate Authority 120. The wide acceptance and trust associated with the Certificate Authority 120 is obtained as a result of the accreditation process necessary for becoming a Certificate Authority that allows the Certificate Authority to play the role of a trusted third party in the PKI protocols.

Figure 2:
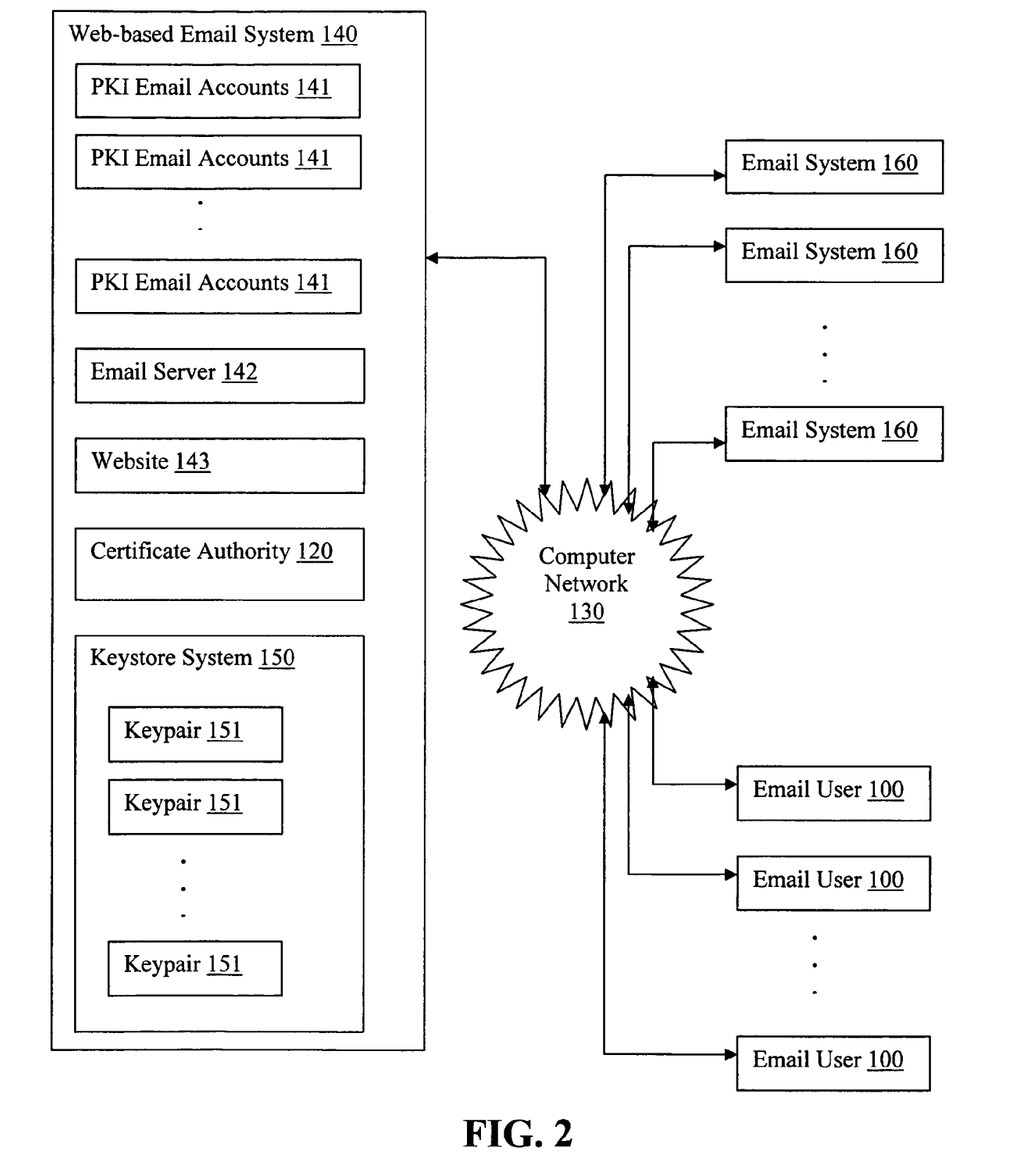
FIG. 2 is a block diagram illustrating another example embodiment of the invention.

The Certificate Authority 120 may assist in the process of creating PKI Email Accounts 141 (which will be discussed in greater detail below in reference to FIG. 6) on the Web-based Email System 140. The Certificate Authority 120 may be a stand alone as shown in FIG. 1 or may be integrated into a Web-based Email System 140 as shown in FIG. 2. A stand alone Certificate Authority 120 will typically be owned and operated by a different entity than the Web-based Email System 140. An integrated Certificate Authority 120 will typically be owned and operated by the same entity as the Web-based Email System 140 and thus may more easily share software and hardware resources, thereby allowing for more efficient communication processes.

In either case, improvements over the prior art may be made by coordinating the activities of the Web-based Email System 140 with the Certificate Authority 120. The Certificate Authority 120 may also be accessed by other Email Systems 160 so that the other Email Systems 160 may create PKI Email Accounts for their Email Users 100. In a preferred embodiment, the Certificate Authority 120 is able to issue S/MIME certificates. The Certificate Authority 120 may also be used to issue other certificates, such as SSL certificates. The Certificate Authority 120 and the Web-based Email System 140 are preferably integrated sufficiently to allow the Web-based Email System 140, which may be based on options selected by an Email User 100, to automatically request and receive a new certificate for the Email User 100 when the current certificate is near to its expiration date. Since this may be done without interaction by the Email User 100 (other than enabling this process), it greatly simplifies the process for the Email User 100 in maintaining a current certificate.

A Keystore System 150 may be used to store data, such as digital "keypairs" 151, and to perform functions, such as signing, verifying, encrypting, and decrypting emails using the digital "keys." The "keypairs," are a public and a private key for each PKI Email Account 141. The Keystore System 150 may also store a public key for recipients of emails that do not have a PKI Email Account 141 with the Web-based Email System 140.

The Keystore System 150 may be a stand alone Keystore System 150 as shown in FIG. 1 or the Keystore System 150 may be integrated into the Web-based Email System 140 as shown in FIG. 2. A stand alone Keystore System 150 will typically be owned and operated by a different entity than the Web-based Email System 140. An integrated Keystore System 150 will typically be owned and operated by the same entity as the Web-based Email System 140 and thus may more easily share software and hardware resources, thereby allowing for more efficient communication processes.

A stand alone Keystore System 150 may have the advantage of being easier for other Email Systems 160 to access and use via the Computer Network 130. This allows the Keystore System 150 to provide services to other Email Systems 160.

An integrated Keystore System 150 will typically have the advantage of being easier and faster to access and use by the Web-based Email System 140. An integrated Keystore System 150 may also be made accessible to other Email Systems 160, but will generally not be as easily accessed and used as a stand alone Keystore System 150. The Keystore System 150 is not necessary for every embodiment since the functions and abilities attributed to the Keystore System 150 in the following description may be performed in whole or in part by the Web-based Email System 140.

Figure 3:
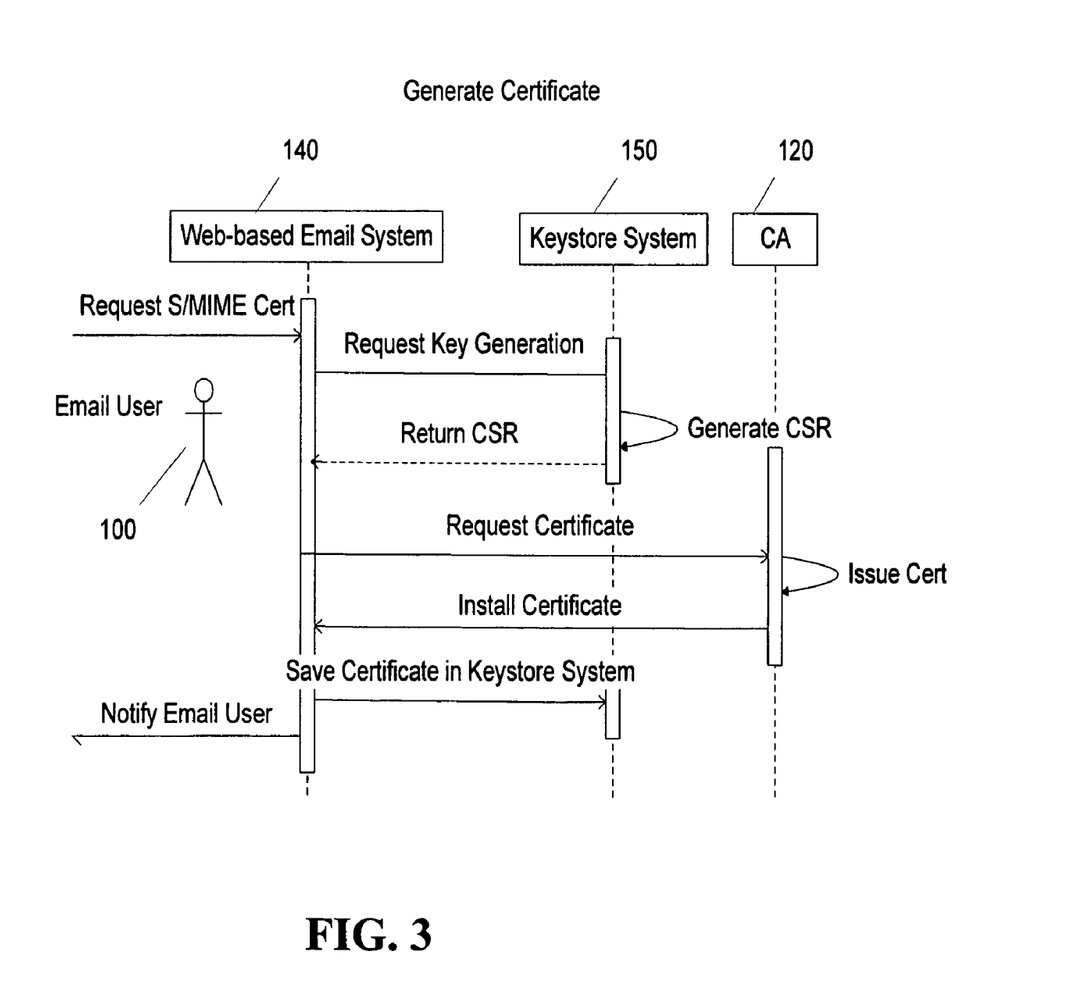
FIG. 3 is an illustration for a method of creating a PKI Email Account.
Figure 6:
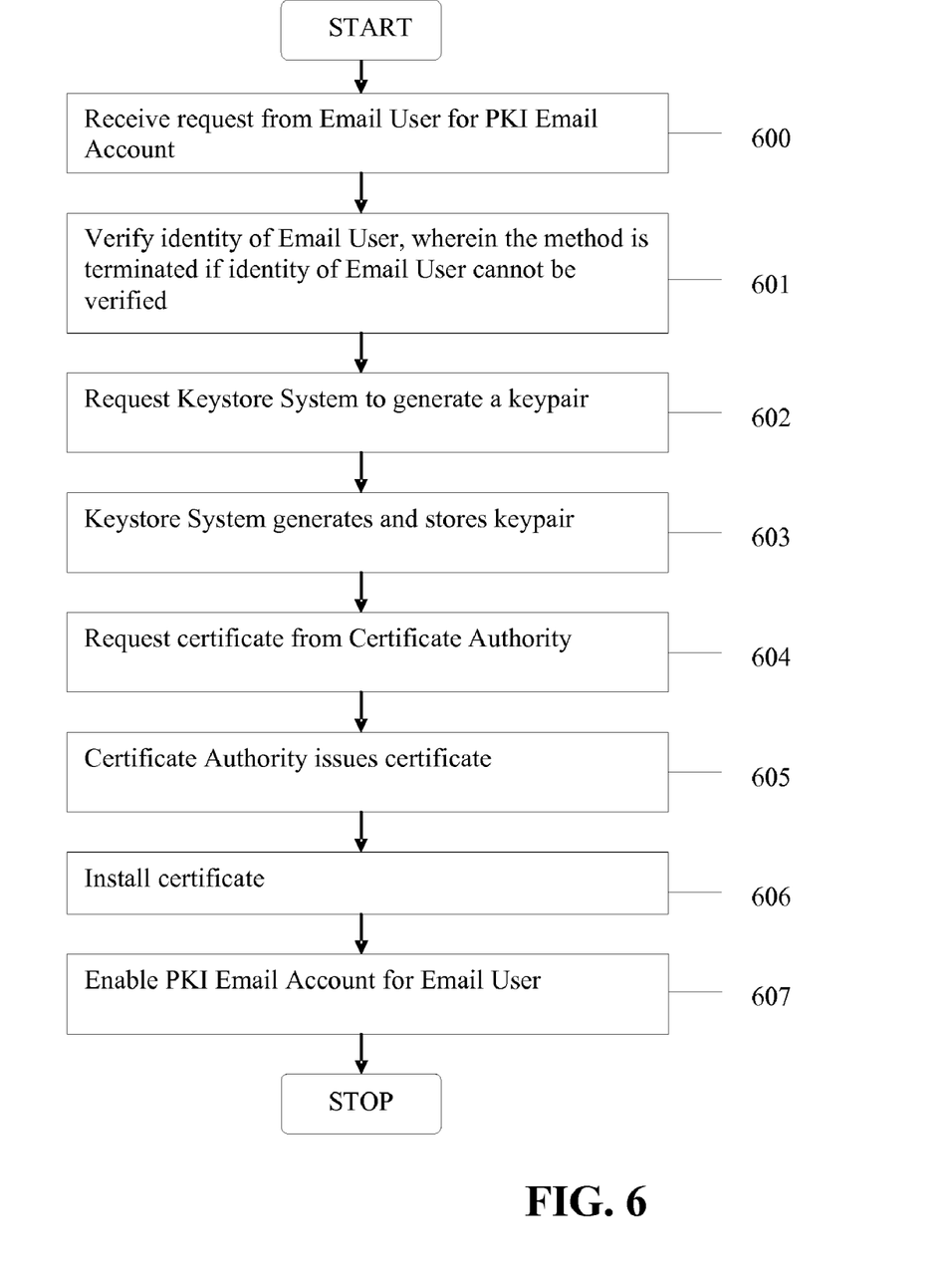
FIG. 6 is a flowchart illustrating an example method of practicing the invention.

A typical process for creating a PKI Email Account 141 with a Web-based Email System 140 is illustrated in FIG. 3 and FIG. 6. An Email User 100 may access a Website 143 for the Web-based Email System 140 to request a PKI Email Account 141 or to request an upgrade from an existing email account to a PKI Email Account 141 (step 600).

The Website 143 may be dedicated to creating new PKI Email Accounts 141 or it may be used for additional purposes, such as selling other items or services. The Website 143 may obtain information from the Email User 100, such as the Email User's name and email address and store the information in a Keystore System 150.

The first Website may verify the identity of the Email User 100 by collecting identification information (step 601). This verification process, if used, may be as simple as requesting supporting documentation from the Email User 100 or as sophisticated as requesting the input of biometric data from the Email User 100. The process of generating a PKI Email Account 141 may be terminated if the identity of the Email User 100 is not verified.

The Web-based Email System 140 may request (step 602) a Keystore System 150 to generate and store (step 603) a keypair 151 for the Email User 100, whose PKI Email Account 141 is being created. The keypair includes a public key and a private key which are used during PKI signing, verification, encryption, and decryption processes.

Keystore System 150 may be used to generate a Certificate Signing Request (CSR) for the Email User 100 creating the PKI Email Account 141. The CSR may include the public key and a distinguished name, i.e. a unique name conforming to a standardized format, for the Email User 100. The Keystore System 150 may send the CSR to a Certificate Authority 120 for signing (step 604). The Certificate Authority 120 may sign the CSR and return a certificate to the Keystore System 150 (step 605). Once the Keystore System 150 receives the certificate from the Certificate Authority 120, it may install the certificate (step 606) and enable the Email User's PKI Email Account 141 (step 607).

In a preferred embodiment, the Keystore System 150 (or Web-based Email System 140) has already developed a high level of trust and coordination with the Certificate Authority 120. This may be easily accomplished if configured as in FIG. 2 where the Certificate Authority 120 and the Keystore System 150 are created as integral entities of a single Web-based Email System 140. However, a high level of trust and coordination between the Keystore System 150 and the Certificate Authority 120 may also be obtained even if they are created as separate entities as shown in FIG. 1. A significant benefit over the prior art is that the Certificate Authority 120 may automatically trust all CSR's sent to it by the Keystore System 150 (since the Keystore System 150 has already been verified and is trusted by the Certificate Authority 120) thereby eliminating the verification process by the Certificate Authority 120.

Other embodiments may have the Certificate Authority 120 perform additional verification steps to create a "High Assurance" certificate before sending the certificate back to the Keystore System 150. The certificate is preferably an S/MIME certificate since this is currently the most popular PKI encryption protocol used for email.

Figure 4:
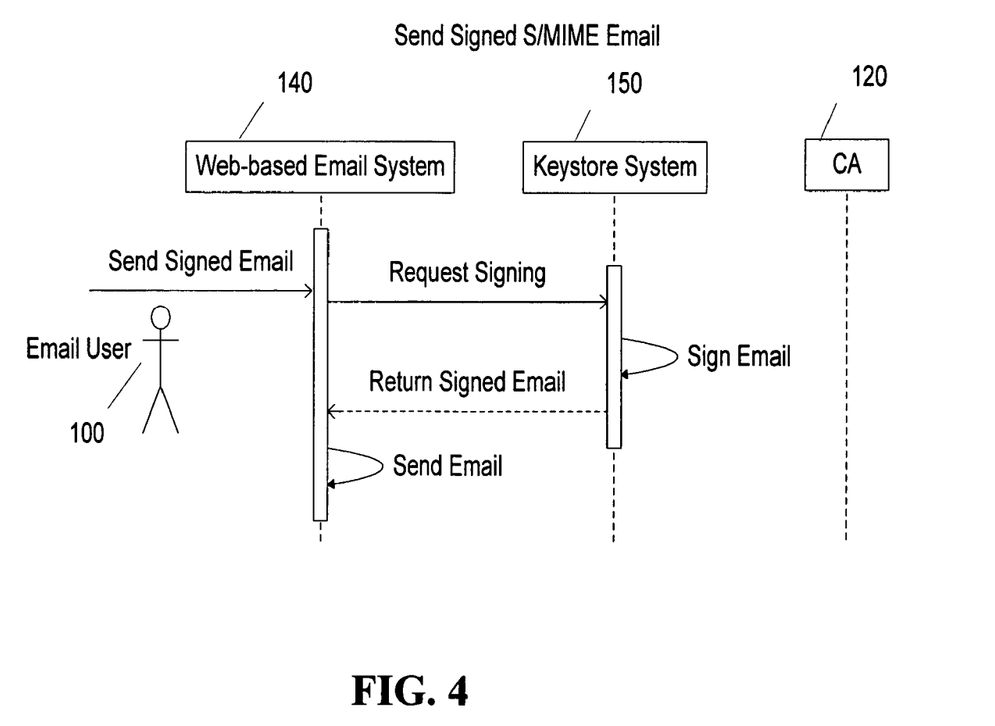
FIG. 4 is an illustration for a method of sending a digitally signed email.
Figure 7:
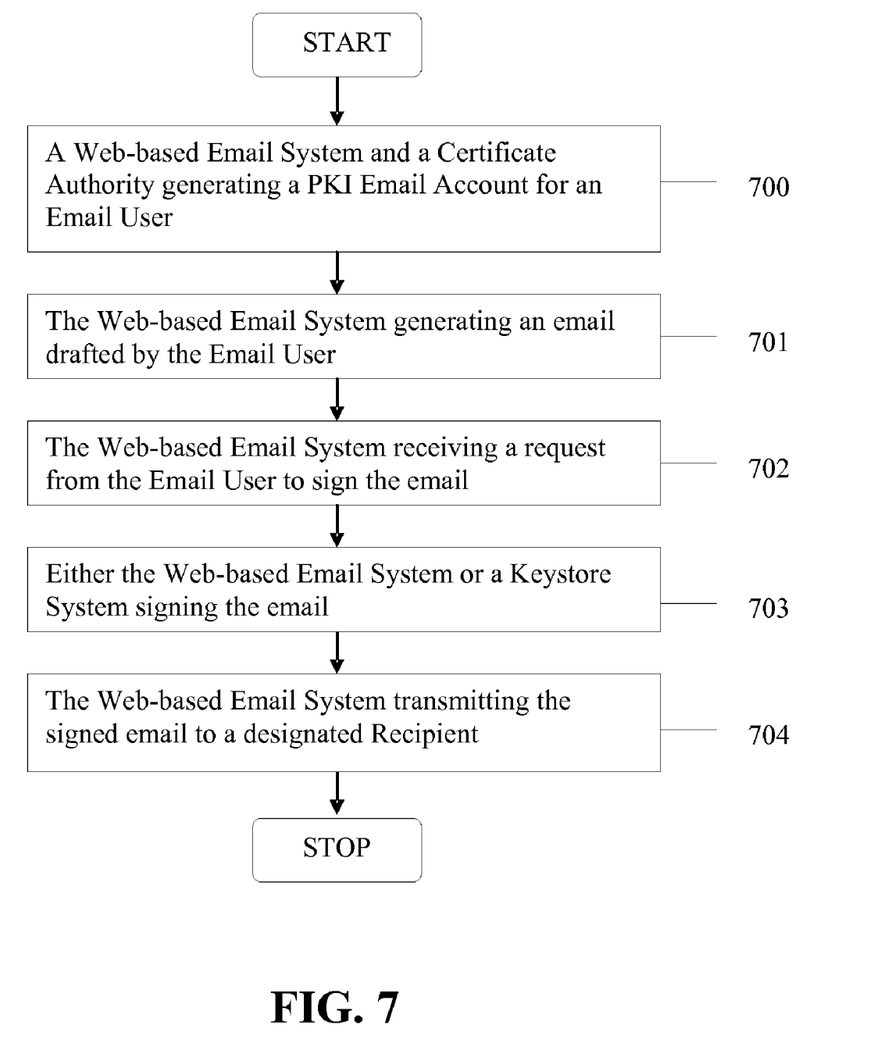
FIG. 7 is a flowchart illustrating another example method of practicing the invention.

A method for PKI signing an email is illustrated in FIG. 4 and FIG. 7. This method may be initiated by an Email User 100 requesting a PKI Email Account 141 from a Web-based Email System 140 (step 700). The method used to generate the PKI Email Account 141 is preferably the same method disclosed above in reference to FIG. 3 and FIG. 6. The Web-based Email System 140 may be used to assist the Email User 100 in sending one or more emails (step 701) through the use of a second Website. The second Website and the first Website may be the same websites.

After an email has been drafted on the second Website of the Web-based Email System 140, the Email User 100 may request that the email be digitally signed (step 702). Either the Web-based Email System 140 or the Keystore System 150 may be used to digitally sign the email with the Email User's private key that was created and stored during the creation of the PKI Email Account 141 (step 703). The Web-based Email System 140 may then send the digitally signed email to a designated Recipient (step 704).

Figure 5A:
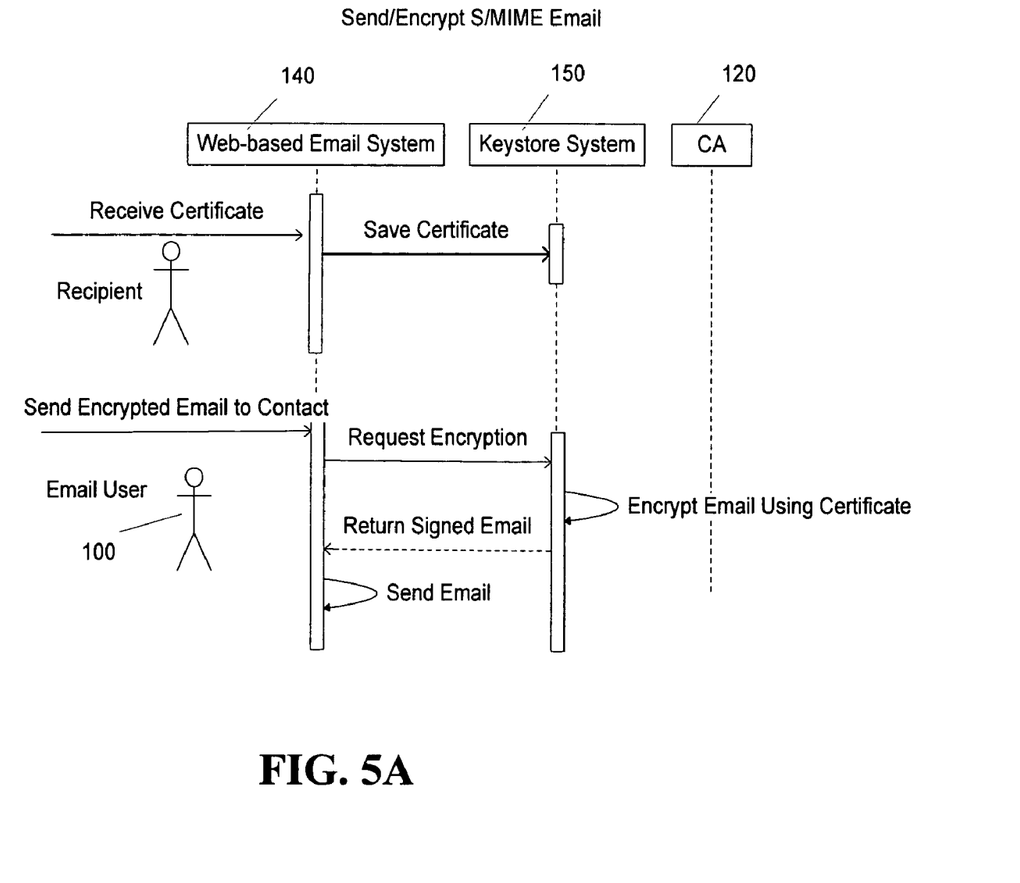
FIG. 5A is an illustration for a method of encrypting and sending an email.
Figure 5B:
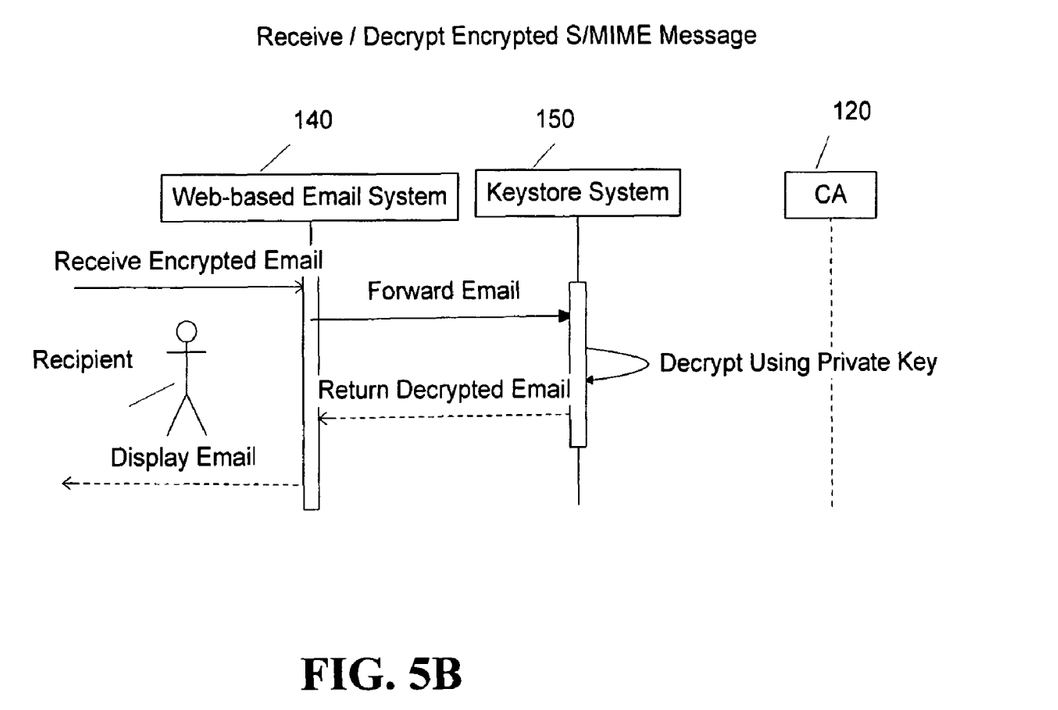
FIG. 5B is an illustration for a method of receiving and decrypting an email.
Figure 8:
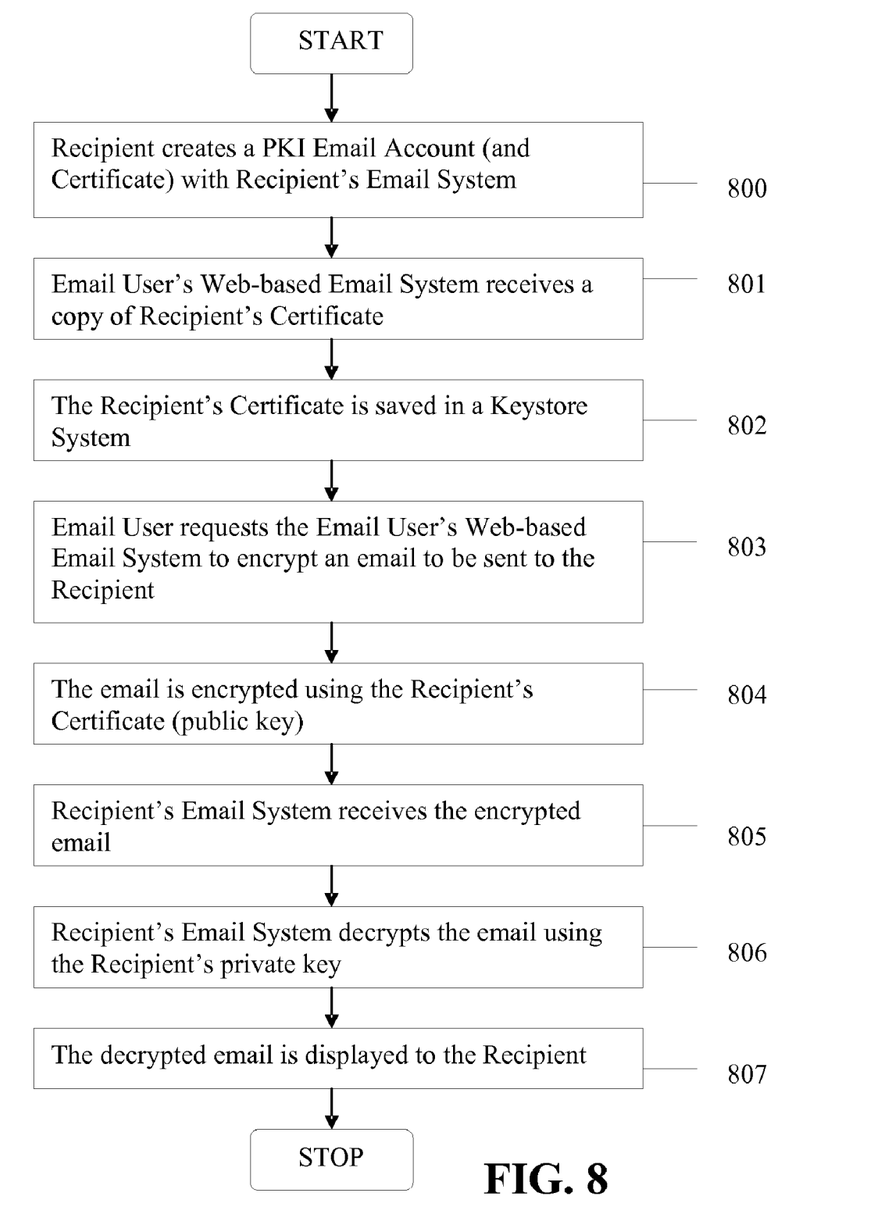
FIG. 8 is a flowchart illustrating another example method of practicing the invention.

A method for securely sending and receiving an encrypted email over a Computer Network 130 is illustrated in FIG. 5A, FIG. 5B and FIG. 8. This method may be initiated by a Recipient requesting a PKI Email Account from Recipient's Email System 160 (step 800), thereby producing a Certificate (with the Recipient's public key) for the Recipient. The method used to create Recipient's PKI Email Account may be similar to the method disclosed above in reference to FIG. 3 and FIG. 6.

The Recipient's Email System 160 may send the Recipient's Certificate (or at least the Recipient's identity and public key) to the Web-based Email System 140 (step 801). The Web-based Email System 140 may save the Recipient's Certificate, preferably in a Keystore System 150 (step 802). Once the Recipient's Certificate has been saved, the Email User 100 may send any number of encrypted emails to the Recipient using the saved Certificate. In alternative embodiments, the Recipient's Certificate may be obtained from a Lightweight Directory Access Protocol (LDAP) directory or from previously sent messages.

The Email User 100 may create an email and request the Web-based Email System 140 to encrypt the email prior to sending the email to the Recipient (step 803). The Web-based Email System 140 or the Keystore System 150 may encrypt the email using the Recipient's saved Certificate containing the Recipient's public key (step 804).

The Recipient's Email System 160 may receive the encrypted email from the Web-based Email System 140 (step 805). The Recipient's Email System 160 may decrypt the email using the Recipient's private key generated and stored during the creation of the Recipient's PKI Account (step 806). The Recipient may be notified of the email and the decrypted email may then be displayed to the Recipient at the Recipient's request (step 807).

All communications between the Email User 100 and the Web-based Email System 140 for all of the described processes may be encrypted using, for example, the Secure Socket Layer (SSL) encryption protocol. This greatly reduces the likelihood of emails being intercepted as they are generated on the Web-based Email System 140 or as the Web-based Email System 140 displays received emails to the Email User 100. An improved process for a Website to receive an SSL certificate is disclosed in U.S. patent application Ser. No. 10/877613 titled Automated Process for a Web Site to Receive a Secure Socket Layer Certificate and in U.S. patent application Ser. No. 10/877609 titled Method for a Web Site with a Proxy Domain Name Registration to Receive a Secure Socket Layer Certificate, both assigned to The Go Daddy Group, Inc. and both are hereby incorporated by reference.

Multiple variations and modification to the disclosed embodiments will occur, to the extent not mutually exclusive, to those skilled in the art upon consideration of the foregoing description. For example, not all steps are required to be performed in the order disclosed and in fact some steps may be skipped altogether in certain embodiments of the invention. Such variations and modifications, however, fall well within the scope of the present invention as set forth in the following claims.

What is claimed is:

1. A system, comprising:
    a PKI email account website displayed on a client computer and hosted on one or More computers in a network, wherein the client computer does not store or recall PKI keys and wherein the PKI email account website is dedicated to creating one or more PKI email accounts and is configured to:
    i) receive a PKI email account request from a user of the PKI email account website, wherein the PKI email account request is the only interaction required by the user to create the one or more PKI email accounts;
    ii) generate and send a certificate signing request to a certificate authority which does not interact with the user, wherein the certificate authority automatically trusts one or more certificate signing requests from the PKI email account website and wherein the certificate authority is hosted on the one or more computers hosting the PKI email account website;
    iii) receive and install a certificate issued and signed by the certificate authority;
    iv) create the one or more PKI email accounts, wherein the one or more PKI email accounts are configured to access one or more cryptographic functions, without transmitting PKI digital keys through the network, to securely receive and transmit email, wherein the one or more PKI email accounts are accessible to an email website displayed on the client computer or on any computer connected to the Internet and wherein the email website is configured to read and send email messages; and
    v) digitally sign email transmitted from the email website by accessing the one or more PKI email accounts, upon request of the user that the email messages be digitally signed.

2. The system of claim 1, wherein the PKI email account website further comprises an integrated keystore system accessible to a plurality of other email systems.

3. The system of claim 1, further comprising a keystore system accessible by one or more email systems via the network.

4. The system of claim 1, further comprising an integrated keystore system.

5. The system of claim 1, wherein the PKI email account website accesses a private key of one of the users from a keystore system and digitally signs an email by one of the users using the private key.

6. The system of claim 1, further comprising a keystore system, wherein the keystore system accesses a private key of one of the users and digitally signs an email by one of the users using the private key.

7. A method comprising the steps of:
    a) hosting a PKI email account website on one or more computers in a network, wherein the PKI email account website is dedicated to creating a PKI email account and is configured to:
    i) receive a PKI email account request from a user, wherein the PKI email account request is the only interaction required by the user to create the PKI email account;
    ii) generate and send a certificate signing request to a certificate authority which does not interact with the user, wherein the certificate authority automatically trusts one or more certificate signing requests from the PKI email account website and wherein the certificate authority is hosted on the one or more computers hosting the PKI email account website;
    iii) receive and install a certificate issued and signed by the certificate authority;
    iv) create the PKI email account configured to access one or more cryptographic functions, without transmitting one or more PKI digital keys through the network, to securely receive and transmit email, wherein the PKI email account is accessible to an email website displayed on a client computer or on any computer connected to the Internet, wherein the email website is configured to read and send email messages and wherein the client computer is not relied on to store or recall PKI keys;
    b) receiving an email drafted by the user;
    c) receiving a request from the user to digitally sign the email;
    d) digitally signing the email using a private key generated for the user; and
    e) sending the digitally signed email via an email server communicatively coupled to the PKI email account website and integrated with the certificate authority.

8. The method of claim 7, wherein a keystore system is integrated with the PKI email account website and is accessible to a plurality of other email systems.

9. The method of claim 7, wherein the private key never goes to the client computer.

10. The method of claim 7, wherein the private key never leaves the PKI email account website.

11. The method of claim 7, wherein the private key is never revealed to the user.

12. A method comprising the steps of:
    a) hosting a PKI email account website on one or more computers in a network, wherein the PKI email account website is dedicated to creating a PKI email account and is configured to:
    i) receive a PKI email account request from a user, wherein the PKI email account request is the only interaction required by the user to create the PKI email account;
    ii) generate and send a certificate signing request to a certificate authority which does not interact with the user, wherein the certificate authority is hosted on the one or more computers hosting the PKI email account website and wherein the certificate authority to automatically trusts one or more certificate signing requests from the PKI email account website;
iii) receive and install a certificate issued and signed by the certificate authority;
iv) create the PKI email account configured to access one or more cryptographic functions, without transmitting one or more PKI digital keys through the network, to securely receive and transmit mail, wherein the PKI email account is accessible to an email website configured to read and send email messages displayed on a client computer, or any computer connected to the Internet, and wherein the client computer is not relied on to store or recall PKI keys;

b) receiving an email drafted by the user;
c) receiving a request from the user to digitally sign the email using the certificate received from the certificate authority and stored with a private key in an integrated keystore system comprising a data storage on one or more computers in the network;
d) digitally signing the email; and
e) transmitting the email to a designated recipient.

13. The method of claim 12, wherein the certificate authority and the integrated keystore system have a network connection with the PKI email account website.

14. The method of claim 12, wherein the private key is never revealed to the user.

15. The method of claim 12, wherein the private key is only revealed to either the PKI email account website or the keystore system.

\* \* \* \* \*